United States Patent [19]

Centala et al.

[11] Patent Number: 4,642,774
[45] Date of Patent: Feb. 10, 1987

[54] AUTOMATIC FLIGHT CONTROL WITH PILOT FLY-THROUGH

[75] Inventors: John P. Centala, Marion; Kenneth W. McElreath, Cedar Rapids, both of Iowa

[73] Assignee: Rockwell International Corporation, El Segundo, Calif.

[21] Appl. No.: 394,360

[22] Filed: Jul. 1, 1982

[51] Int. Cl.⁴ .............................. B64C 13/18
[52] U.S. Cl. .......................... 364/434; 244/197
[58] Field of Search ............... 364/433, 434, 439; 244/175, 177, 181, 196, 197

[56] References Cited

U.S. PATENT DOCUMENTS

| | | | |
|---|---|---|---|
| 3,265,333 | 8/1966 | Montooth | 244/196 |
| 3,386,689 | 6/1968 | Parker et al. | 244/197 |
| 3,807,666 | 4/1974 | Devlin | 244/197 |
| 3,848,833 | 11/1974 | Rauschelbach | 244/177 |
| 4,003,532 | 1/1977 | Adams, Sr. et al. | 244/197 |
| 4,236,685 | 12/1980 | Kissel | 244/196 |
| 4,387,430 | 6/1983 | Verzella et al. | 244/177 |
| 4,387,431 | 6/1983 | Wright et al. | 244/177 |

Primary Examiner—Gary Chin
Attorney, Agent, or Firm—George A. Montanye; Robert C. Mayes; H. Fredrick Hamann

[57] ABSTRACT

A system and technique is disclosed which enables an aircraft to naturally respond to pilot inputs during automatic flight control of aircraft attitude or course and to smoothly return to that attitude or course following pilot maneuvers. The aircraft attitude control channels of an aircraft control system are held at a predetermined attitude reference by an automatic flight control system or programmed to follow a particular navigational course by a flight director guidance system. The aircraft control stick is coupled to disconnect the predetermined pitch and roll attitude from flight control following a stick movement of a predetermined distance or the application of a predetermined force to the stick so that the AFCS or flight director guidance system no longer attempts to hold the set attitude or navigational course. The control stick commands an angular rate of change proportional to the magnitude of the pilot's stick displacement or force. Upon release of the force and return of the aircraft control stick to a neutral position, a "fly through" fading circuit smoothly returns the aircraft to its original attitude or navigational course.

9 Claims, 1 Drawing Figure

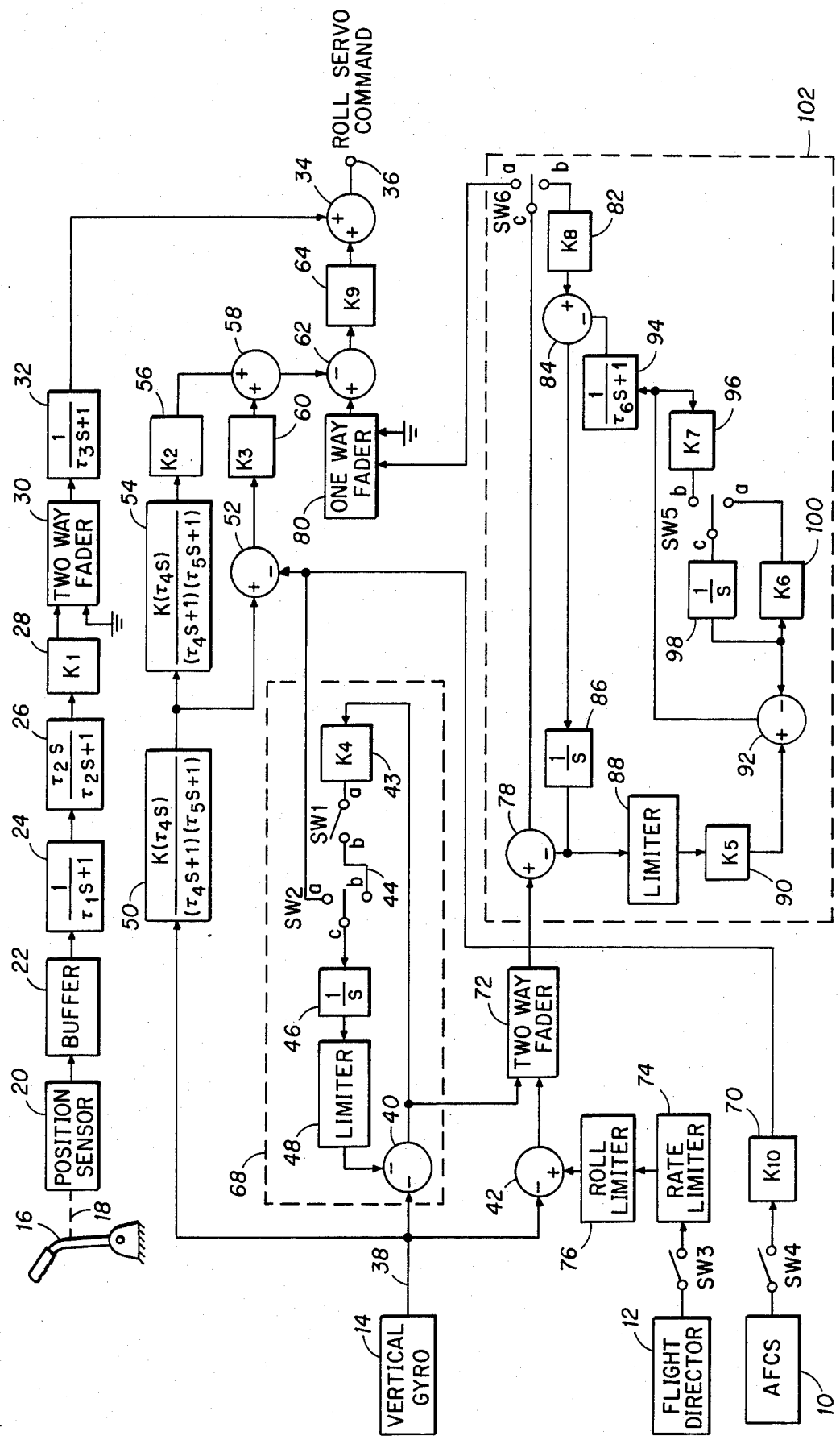

AUTOMATIC FLIGHT CONTROL WITH PILOT FLY-THROUGH

BACKGROUND OF THE INVENTION

The present invention relates to aircraft control systems and more particularly to automatic flight control systems which allow normal manual maneuvering during automatic attitude or navigational course control.

A highly desirable function of an aircraft control system is to provide automatic maintenance of attitude by control of aircraft pitch, roll and yaw axes or automatic maintenance of a navigational course or flight path through programmed control of those axes. During operation with automatic control systems, however, it is also desirable to enable the pilot to provide input commands through manual operation of the control stick while still allowing the aircraft to return to its automatic control and previous attitude or course following manual maneuvering. While the above dual control is desirable, prior art systems have encountered great difficulty in providing automatic systems which enable natural aircraft response to manual inputs during operation in the automatic mode.

In one prior art system, the automatic flight control system (AFCS) uses full time attitude command augmentation to implement the control system and allow manual override through pilot input. In these systems, the memorized attitude reference or navigational command in a selected axis is provided to control the system at the same time that the pilot input is being implemented through the control stick. As a result, a stick force or displacement is required which is proportional to attitude thereby resulting in a requirement that large forces or displacements be utilized to overcome the predetermined attitude commands. The large forces or displacements which are required cause an unnatural response by the aircraft to control stick inputs.

In still other systems, an automatic flight control with rate command augmentation and attitude hold functions is utilized to allow manual control of the aircraft by natural stick movement during automatic flight. In such systems, however, the AFCS maintains a current attitude reference through control of the selected channels when the aircraft control stick is in a neutral position and not being maneuvered by the pilot. When the control stick is moved, the aircraft responds in a natural way with a rate of change which is constant and proportional to stick displacement. However, upon release of the aircraft control stick following the manual fly-through maneuvering, the AFCS maintains the attitude reference last achieved by the pilot rather than returning to the originally commanded attitude reference or navigational course. This prevents a pilot from manually maneuvering the aircraft while still allowing the AFCS to return the aircraft to the previous attitude reference or navigational course following that manual input. Accordingly, if a pilot becomes disoriented or the control stick is accidentally moved, the aircraft cannot regain the original attitude reference or navigational course without pilot assistance.

In each of the above cases, there are deficiencies and limitations on aircraft operation. Specifically, the first system requires unnatural stick displacement resulting in feedback to the pilot which is not similar to aircraft response during normal manual control. Such feedback may be confusing and result in improper operation of the aircraft during critical flight periods of automatic control or reversion to manual control. Likewise, in the second example, the system is not capable of returning to a predetermined attitude reference or flight path which may be desirable under various flight conditions. Thus, although the aircraft responds naturally to aircraft control stick movements without an unnatural feel, the cost of providing that natural response is the loss of a return to a predetermined attitude reference or navigational course. The systems therefore fail to provide needed control during automatic flight conditions to allow more safe and effective operation of the aircraft in various environments.

The present invention has been developed to overcome the shortcomings of the above known and similar techniques and to provide a system and technique which allows normal manual control during automatic flight and return to a predetermined attitude reference or navigational course following manual maneuvering.

SUMMARY OF THE INVENTION

In accordance with the present invention, a control system is disclosed which provides automatic flight control to maintain a preset reference attitude or to follow a programmed navigational course while allowing natural aircraft response to manual pilot inputs and automatic return to the predetermined attitude or course. The system includes a memory circuit which stores the commanded attitude and maintains that attitude during flight while under automatic control. Upon movement of the control stick by the pilot, the stored attitude reference is disconnected from the circuit and the stick displacement is used to control signal input for varying the command rate at a constant value in proportion to stick displacement. At the same time, a fly-through circuit stores a value representative of the new attitude in a double loop memory circuit. Upon release of the control stick and its return to a neutral position, the memory circuit storing the reference attitude is combined with the output of the fly-through circuit to produce the attitude steering command for returning the aircraft to the originally stored attitude reference. The fly-through circuit produces a signal output when combined with the memorized attitude which enables a smooth return from the manually maneuvered position to the previous attitude. Rather than an abrupt return, the double loop fly-through circuit produces a controlled and gradual return more similar to a normal pilot controlled operation.

It is therefore a feature of the invention to provide an aircraft control system and technique which is more versatile in operation.

It is a further feature of the invention to provide an aircraft control system and technique which enables natural pilot input during automatic flight control.

Still another feature of the invention is to provide a flight control system and technique which allows automatic maintenance of an attitude or navigational course and return to that predetermined reference following manual pilot input.

A still further feature of the invention is to provide a fly-through circuit in an automatic flight control system for allowing a smooth return to a predetermined attitude or course following pilot flight modifications.

Yet a further feature of the invention is to provide pilot control of flight during automatic maintenance of attitude or navigational course with a natural aircraft response to control stick movement.

These and other advantages and novel features of the invention will become apparent from the following detailed description when considered with the accompanying drawing wherein:

BRIEF DESCRIPTION OF THE DRAWING

The FIGURE is a schematic block diagram showing the control laws governing an exemplary channel of the flight control system of the present invention.

DETAILED DESCRIPTION OF A PREFERRED EMBODIMENT

Referring now to the drawing, there is shown one implementation of the automatic control and fly-through system in accordance with the present invention. In this example, the inventive system and technique will be described with reference to its configuration in the roll channel of an aircraft control system. However, the technique is applicable to other channels and is not intended to be restricted solely to the roll channel. The construction and operation of the system and technique in other channels will become apparent from the following detailed description with respect to the roll channel.

Normally, an automatic aircraft control system will include conventional elements including an automatic flight control system 10, a flight director computer 12, a vertical gyro 14 and an aircraft control stick 16. The AFCS 10 performs various functions as is known in the art and in the present example is used to provide an output which may be entered through switch SW4 to produce or modify an attitude reference for maintenance of a preset aircraft attitude. The AFCS 10 while only showing the one output through switch SW4 is not limited thereto and performs all other functions necessary to aircraft control in accordance with known techniques.

Likewise, the flight director 12 includes a computer system which receives navigational aids, controls computations and course settings, makes calculations and changes, commands heading and altitude changes, and provides the control signals necessary to command roll, pitch and yaw changes for aircraft attitude control. In this particular example, a control signal output to switch SW3 is shown which includes a signal which may represent a commanded roll function for operation in the representative roll channel control depicted in the FIGURE. Naturally, the output from flight director 12 although shown as a single output, is intended to include all other control functions as would normally be encountered in such an aircraft control system.

The vertical gyro 14 is a conventional structure which provides an output representing an attitude position of the aircraft, in this case a roll attitude signal. The vertical gyro provides a reference with respect to which the position of the aircraft may be controlled by either the automatic flight control system or flight director in automatic modes. The vertical gyro 14, in the present example, provides an output representing the roll attitude of the aircraft with respect to that reference system.

An aircraft control stick, schematically represented at 16, provides the manual control which allows the pilot to exercise various functions for aircraft movement. The control stick 16 may be a typical aircraft control mechanically coupled to position sensors which provide an electrical indication of stick movement in any direction. In the present example, the stick control will be referenced with respect to its movement for roll changes, it being apparent that its coupling and operation with respect to yaw and pitch will be accomplished in a similar fashion. The mechanical linkage generally shown by dotted line 18 is coupled to a position sensor 20 which provides an output signal proportional to the position of the stick in the roll axis. The position sensor 20 is constructed to provide a signal which produces a constant aircraft roll rate which is proportional to stick displacement. The stick 16 and position sensor 20 could just as well be constructed in a known manner to provide a constant aircraft roll rate proportional to the force required to displace the control stick 16. At any rate, the constant aircraft roll rate is provided at each position to provide a response which is more natural to the pilot for maintaining aircraft control.

The output from position sensor 20 is coupled to a conventional buffer 22 and thence to filters 24 and 26. The output from filter 26 is coupled through an amplifier 28 having a gain K1 and having its output coupled to a conventional two-way fader 30. The fader 30 acts in a conventional manner to couple the signal from 28 to its output upon movement of the stick from a predetermined position and alternatively to couple its output to ground when the stick is in the neutral position. The output from fader 30 is coupled through a filter 32 and thence as an input to a positive terminal of summing circuit 34. The output 36 of the summing circuit 34 is a roll servo command signal which is coupled to aircraft servo mechanisms to cause aircraft roll in the signalled direction at a rate determined by the magnitude of the signal. If the output from filter 32 were the only command input to summing circuit 34, it is readily apparent that the signal from 32 would constitute the sole roll servo command signal controlling aircraft movement. In operation in other than the automatic flight mode for maintaining aircraft attitude or the computer controlled mode for maintaining a predetermined navigational course, the aircraft will be solely controlled by stick movement in the roll axes through summing circuit 34 (as modified by rate deriver through summing circuits 52, 58 and 62).

The output from the vertical gyro 14 in the roll channel provides a signal to line 38 representing the roll attitude of the aircraft. This signal is provided as input to summing circuit 40 and summing circuit 42. The output of summing circuit 40 is coupled as input to amplifier 43, having a constant gain K4, and thence to terminal a of switch SW1. Terminal b of switch SW1 is coupled through line 44 to terminal b of switch SW2 having terminals a and b and common terminal c. Terminal c of switch SW2 is coupled through an integrator 46 whose output is coupled through limiter 48 and thence to a second input of summing circuit 40. Integrator 46 stores the attitude reference but other circuit configurations can be used to provide this function.

The vertical gyro signal on line 38 is also coupled as input to a conventional rate deriver 50 which has its output coupled as one input to summing circuit 52. The rate deriver 50 is a differentiating circuit which performs a first derivative of the roll attitude signal from line 38 with respect to time. The output from rate deriver 50 is also coupled through a second differentiating unit 54 which differentiates the output signal from 50 in the same manner as signal 38 to provide a second derivative of the signal from 38 with respect to time (a signal representing angular acceleration). The acceleration signal from the output of 54 is coupled to an amplifier 56 having a gain K2, and also having its output coupled as one input to summing circuit 58. The output from summing circuit 52 is likewise coupled to an amplifier 60 having gain K3. The output from amplifier 60 is coupled as the second input to summing circuit 58 and added to the signal from amplifier 56. The output from summing circuit 58 is then coupled as one input to summing circuit 62 which has its output coupled through amplifier 64 having gain K9. The output from amplifier 64 is likewise added as a second input to summing circuit 34 to modify the roll servo command signal provided by the stick 16. As can be seen, the signal from rate deriver 50 and the acceleration signal from 54 will provide modifying signals through summing circuit 62 and summing circuit 34 to control the roll servo command even when the aircraft is being manually flown solely by stick movement.

Referring again to summing circuit 40 and associated elements 43, 46 and 48, the same form a memory loop 68 which acts to store a signal representing a predetermined attitude reference for the roll channel. The output through switch SW4 in the AFCS 10 represents a desired attitude reference slew signal and is coupled upon closure of switch SW4 through amplifier 70 having a constant gain K10, which has its output coupled as a second input to summing circuit 52 (for subtraction from the signal output from 50) and to terminal a of switch SW2. As will be understood, when switch SW2 is moved to the position where terminals a and c are coupled to one another, the signal output from AFCS 10 through switch SW4, representing the attitude reference slew for the roll channel is coupled to the integrator 46. The signal at the output of 46 is thus a representation of the desired roll attitude which is stored by integrator 46 and provided as one input to summing circuit 40. The signal is stored by moving switch SW2 to electrically couple terminals b and c together.

Similarly, the output of summing circuit 40 is coupled through amplifier 43 to switch SW1 to provide input to integrator 46 when switch SW1 is closed to electrically couple its terminals a and b. By movement of the switch SW1 from an open to a momentarily closed position while switch SW2 has its terminals b and c electrically coupled to one another, the loop 68 is capable of altering the memorized attitude to synchronize it with the current flight attitude as will be subsequently described.

The output from summing circuit 40 is provided as one input to a conventional two-way fader 72 which also receives output from summing circuit 42. A signal output from flight director 12 representing a commanded roll may be provided through a closed switch SW3 through a roll command rate limiter 74 and a roll limiter 76 as a second input to summing circuit 42. Normally, the fader 72 will provide the signal output at 40 to summing circuit 78 when the system is being operated to maintain a predetermined attitude as set by AFCS 10 through switch SW4, and will provide the output of summing circuit 42 to summing circuit 78 when the system is being operated to control roll attitude to follow a commanded navigational course from flight director 12 through switch SW3.

In either case, the output from summing circuit 78 is coupled through a switch SW6 having terminals a and b and a common terminal c. The output terminal a is coupled through a conventional one-way fader which in turn has its output coupled as a second input to summing circuit 62. Terminal b is coupled as input to an amplifier 82 having a constant gain K8 and which has its output coupled as one input to summing circuit 84. The output of summing circuit 84 is coupled through an integrator 86 which has its output coupled to a second input of summing circuit 78 for subtraction from the output signal from fader 72. The output of integrator 86 is also coupled through a limiter 88 and an amplifier 90 having constant gain K5, to a first input of summing circuit 92. The output of summing circuit 92 is coupled through filter 94 as a second input to summing circuit 84 for subtraction from the output signal from 82. The output of summing circuit 92 is also coupled through amplifier 96, having a constant gain K7, to terminal b of switch SW5 having terminals a and b and common terminal c. Terminal c of switch SW5 is coupled through an integrator 98 which has its output coupled to a second input of summing circuit 92 for subtraction from the output signal from 90. The output from integrator 98 is also coupled through an amplifer 100, having a constant negative gain K6, which has its output coupled to terminal a of switch SW5. The elements including integrator 86, summing circuit 84, summing circuit 92 and integrator 98 and the elements coupled thereto, comprise a double loop fly-through control circuit 102 for enabling aircraft return to a reference attitude following manual pilot maneuvering as will be subsequently described.

Referring again to two-way fader 72, when switch SW6 is positioned to couple terminals a and c, the output from summing circuit 78 will cause the roll command servo to be varied to maintain the roll attitude in accordance with that set by the AFCS 10 through switch SW4 or in accordance with a programmed roll command for maintaining a navigational course as set by flight director 12 through switch SW3. Thus, when stick 16 is in the neutral position, SW6 will be positioned to couple terminals a and c together. If the system is in a configuration designed to maintain a reference attitude, the integrator 46 will first be charged to set that predetermined reference attitude by closing switch SW4 and moving switch SW2 to couple terminals a and c. After the predetermined reference attitude has been set, switch SW2 will be operated to a position coupling terminals b and c to one another. At this time the output from summing circuit 40 when compared with the vertical gyro 38 will operate to provide an error signal through two-way fader 72 such that the roll command at output 36 will cause the aircraft to move to reduce the error signal output at summing circuit 40 to zero.

Alternatively, the two-way fader 72 may be operated to pass the output from summing circuit 42 rather than the output from summing circuit 40. In this mode, the commanded roll from flight director 12 is provided by closing switch SW3 and providing that signal to summing circuit 42 where it is compared with the output from vertical gyro 14 over line 38 to provide an error signal which is then coupled through summing circuit 78 to summing circuit 62 and thence to output 36 for moving the aircraft to produce a zero error signal at the output of summing circuit 42. In either case, the error output signal from summing circuit 78 is forced to zero so that the predetermined attitude set by AFCS 10 or the commanded attitude programmed by flight director 12 will be obtained.

During operation, switch SW1 may also be used to synchronize the stored value in integrator 46 with the current aircraft attitude thereby allowing a new reference attitude to be stored during manual aircraft movement. In operation, switch SW1 would be operated in conjunction with control stick 16 so that the new position information would be set during manual pilot control of the aircraft through stick 16. This allows the aircraft to be manually operated while storing a new attitude reference during the course of that manual operation. The double loop fly-through circuit 102 operates to allow transition from a maneuvered position after manual flight control through stick 16, to return the aircraft smoothly to the referenced attitude set by AFCS 10 or the attitude position determined by flight director 12.

In operation, switch SW6 and switch SW5 are coupled to control stick 16 such that when control stick 16 is in the neutral position (first control mode), switches SW5 and SW6 are coupling their respective terminals a and c. When control stick 16 is moved a predetermined distance from the neutral position, switches SW6 and SW5 are operated to move to a position where their respective terminals b and c are coupled to one another. When this occur (second control mode), the output from summing circuit 78 is coupled through amplifier 82, summing circuit 84 and integrator 86 to integrate the output signal through summing circuit 78 through a first loop. At the same time, the output from integrator 86 is also provided through limiter 88, amplifier 90, summing circuit 92, filter 94 and back to summing circuit 84 to modify the signal input to integrator 86. The output from summing circuit 92 is coupled through amplifier 96 and integrator 98 to produce a second loop integration through summing circuit 92.

The effect of the double loop is to produce a signal at the output of integrator 86 which is equal in magnitude to the signal output from two-way fader 72 which drives the error signal at the output of summing circuit 78 to zero. Also, the signal at the output of integrator 98 is equal in magnitude to the signal output from amplifier 90 which drives the signal at the output of summing circuit 92 to zero. During the fly-through condition (second control mode), the stick 16 will provide the control for movement of the aircraft and that signal coupled with the signals from 50 and 54 will produce the roll servo command at output 36. When stick 16 is released and returns to the neutral position, switches SW6 and SW5 return to their original position coupling terminals a and c to one another. At this time (first control mode), rather than producing a large error signal at the output of summing circuit 78, the stored values in integrators 86 and 98 discharge through their respective loops, which discharge is controlled by amplifiers 90 and 100 through summing circuits 92 and 84 and filter 94 to produce a controlled change in the signal at the output of integrator 86 so that the loop signals fade to zero in accordance with a specific profile rather than allowing a large error signal at the output of 78. This operation insures a smooth transition in attitude following release of the control stick 16 and thereby enables reacquisition of the predetermined attitude reference.

The operation of the system in its entirety may easily be understood from the previous descriptions but will be briefly summarized below. Generally, the system will first be set to provide a predetermined roll attitude by closing switch SW4 and providing that signal through terminal a and c of switch SW2 to integrator 46. Alternatively, the signal from flight director 12 may be provided through a closed switch SW3 as input to summing circuit 42 to control attitude for a specific navigational course. The selection of either flight director 12 or AFCS 10 control is made by two-way fader 72. When the switch SW3 is closed and a roll command is provided from flight director 12, the two-way fader operates to couple that signal to the summing circuit 78 and disconnect the output from summing circuit 40 to summing circuit 78. Once switch SW3 is opened no signal is provided by flight director 12 and the fader 72 operates to couple the signal from summing circuit 40 to the summing circuit 78.

If it is assumed that the roll channel is being operated to provide automatic attitude control in response to a reference provided by AFCS 10 through switch SW4, switch SW4 is first closed and switch SW2 is operated to slew the output of integrator 46 by switching SW2 from a position coupling terminals a and c to one another to the position which couples terminals b and c to one another. At this time, the stored output from 46 is provided to summing circuit 40 and thence through two-way fader 72 to summing circuit 78. As long as the aircraft is being automatically controlled and the control stick 16 is in the neutral position, switch SW6 couples terminals a and c to one another and the output from fader 80, along with the output from summing circuit 58, provides a control signal at the output of summing circuit 62 which acts as the roll servo command signal controlling the roll of the aircraft for maintaining the predetermined attitude.

Upon a predetermined displacement of control stick 16 by the pilot, switch SW6 is forced to open the connection between terminals a and c and couple its terminals b and c to one another. At the same time, switch SW5 couples its switch terminals b and c. During this time period, the control stick 16 provides a signal at the output of filter 32 which along with the signal at the output of summing circuit 58, as provided through summing circuit 62, controls the rate of aircraft roll to maintain that fixed by the control stick 16. The aircraft thus naturally responds to stick movement 16 in a manner such that the aircraft roll is a constant rate proportional to stick displacement. At the same time, the output from summing circuit 78 operates to charge the dual loops in the fly-through circuit 102 to a value which produces a zero output signal at the output of summing circuit 78.

Upon the release of control stick 16, and its return to a neutral position, the contacts of switch SW5 and SW6 are changed such that terminals a and c of those respective switches are coupled together. At this time, the output of summing circuit 78 slowly fades from its zero value (as the output of integrator 86 fades to zero) to reflect the error provided at the output of summing circuit 40. This causes summing circuit 62 to provide a roll command signal capable of moving the aircraft to reestablish the attitude memorized by integrator 46 in loop 68. Thus, the signal output from gyro 38 and integrator 46 producing an error signal at the output of summing circuit 40, is gradually reflected at the output of summing circuit 78 so that a smooth transition occurs from the flight commanded by control stick 16 to the attitude reference stored by integrator 46.

At any time during the operation of control stick 16, the system may be operated so that switch SW1 is closed and the attitude indicated on line 38 from vertical gyro 14 is stored by integrator 46. Once switch SW1 has been opened again, integrator 46 will have memorized the new attitude position which appeared at the time switch SW1 was closed. Thereafter, upon release of control stick 16, the output of the signal from integrator 46 will have been modified so that the aircraft returns to that new position stored by closure of switch SW1. The system thus allows automatic return to a predetermined reference attitude or the synchronizing of a new reference attitude during manual maneuvering without additional complex circuitry.

In an exemplary embodiment of the invention, the following values were used for K1–K10 and $\tau_{1-\tau_6}$:

K1 = 1.227
K2 = 0.020
K3 = 0.53
K4 = 30.0
K5 = 0.667
K6 = 3.0
K7 = 20.0
K8 = 100.0
K9 = 0.608
K10 = 3.0
$\tau_1 = 0.1$
$\tau_2 = 5$
$\tau_3 = 0.37$
$\tau_4 = 0.027$
$\tau_5 = 0.01$
$\tau_6 = 0.15$ Each of the above values are examples of those which may be used, it being understood that the same may be varied in accordance with known techniques to achieve operation of the above system as described.

As can be seen by the above description, the present control system enables natural manual fly-through maneuvering during automatic flight while still providing for a smooth aircraft return to a set attitude following that manual maneuvering. A double loop is utilized in the fly-through circuit to prevent abrupt aircraft attitude changes following a manual maneuver and to produce a smooth return to the predetermined attitude. The system can be operated with a preset attitude or a programmed attitude for automatic operation. In the former instance, the stored value can be modified instantaneously during manual maneuvering so that the aircraft returns to an attitude encountered during that manual maneuvering following release of the control stick. The fly-through circuit enables stick movement to control aircraft response in a more natural manner and, in contrast to the prior art, does not require unnecessary forces or loss of a predetermined attitude following a manual maneuver. Each of these are advantages that are not taught or shown by the prior art.

While the invention has been described with reference to particular elements and components, it is apparent that other elements could be employed to accomplish similar functions. Obviously, many other modifications and variations are possible in light of the above teachings. It is therefore to be understood that within the scope of the appended claims, the invention may be practiced otherwise than as specifically described.

What is claimed is:

1. An aircraft attitude control system comprising:
   means for receiving a signal representing a preset aircraft attitude;
   means for receiving a signal representing actual aircraft attitude;
   means for combining said signals to provide an error signal as a control output during a first control mode for automatically controlling said aircraft mode so that said actual aircraft attitude is equal to said preset aircraft attitude;
   means for removing said error signal as said control output during a second control mode and manually substituting a signal as said control output for changing aircraft attitude during said second control mode; and
   means responsive to said error signal for developing a profile signal during said second control mode and modifying said error signal with said profile signal upon return to said first control mode, such that said modified error signal returns said aircraft attitude from a changed attitude to said preset attitude in accordance with a predetermined profile.

2. The system of claim 1 wherein said means for receiving said preset aircraft attitude includes a means for receiving and storing a signal representing a constant attitude.

3. The system of claim 1 wherein said means for receiving said preset aircraft attitude comprises a means for receiving a programmed attitude which changes with respect to time.

4. The system of claim 2 wherein said means for receiving and storing further includes means for modifying said stored attitude at a selected time during said second control mode so that it equals instantaneous aircraft attitude at said selected time.

5. The system of claim 1 wherein said means for removing comprises:
   an aircraft control stick having a neutral position and a displaced position;
   means responsive to said aircraft control stick in said displaced position for disconnecting said error signal as said control output upon displacement of said stick by a predetermined amount and providing a signal commanding a constant rate of aircraft attitude change proportional to stick displacement; and
   means responsive to said neutral position of said aircraft control stick for providing said error signal as said control output to automatically control said aircraft attitude.

6. An aircraft control system comprising:
   means for receiving a signal representing a preset aircraft attitude;
   means for receiving a signal representing actual aircraft attitude;
   means for combining said signals representing preset aircraft attitude and actual aircraft attitude for providing an error signal as a control output for controlling aircraft to maintain actual aircraft attitude equal to said preset aircraft attitude during a first control mode;
   means for manually providing a signal for commanding an aircraft attitude change and providing that signal as said control output in lieu of said error signal during a second control mode and resubstituting said error signal as said control output upon return to said first control mode; and
   means responsive to said manual means for storing a signal during said second control mode and for modifying said error signal upon return to said first control mode in response to said stored signal such that said modified error signal will cause aircraft attitude to return from a commanded attitude change to said preset aircraft attitude in accordance with a preset profile.

7. A technique for providing pilot fly-through in an automatic aircraft attitude control system comprising:

receiving and storing a signal representing a predetermined aircraft attitude;

receiving a signal representing actual aircraft attitude during aircraft flight;

combining said signal representing actual aircraft attitude with said stored signal representing a predetermined aircraft attitude to produce an error signal for automatically controlling aircraft attitude to maintain said predetermined attitude during a first control mode;

manually interrupting said error signal to produce an attitude control signal for changing aircraft attitude during a second control mode and removing said attitude control signal and providing said error signal upon return to said first control mode;

storing a profile signal in response to said manual interruption during said second control mode; and modifying said error signal upon return to said first control mode in response to said stored profile signal to produce a modified error signal which returns said aircraft to said predetermined attitude following a change in attitude in accordance with a predetermined profile.

8. An aircraft attitude control system comprising:

means for receiving a signal representing a preset aircraft attitude;

means for receiving a signal representing actual aircraft attitude;

means for combining said signals to provide an error signal as a control output during a first control mode for automatically controlling said aircraft attitude so that said actual aircraft attitude is equal to said preset aircraft attitude;

means for removing said error signal as said control output during a second control mode and manually substituting a signal as said control output for changing aircraft attitude during said second control mode; and means responsive to said error signal for developing a profile signal during said second control mode and modifying said error signal with said profile signal upon return to said first control mode such that said modified error signal returns said aircraft attitude from a changed attitude to said preset attitude in accordance with a predetermined profile, said means for developing and modifying comprising dual signal integration loops which are coupled to integrate said error signal during said second control mode to produce an integrated signal and to subtract said integrated signal from said error signal to produce said modified error signal upon return to said first control mode and provide said modified error signal as said control output for returning said aircraft to said preset attitude.

9. The system of claim 8 wherein said dual signal integration loops comprise:

a first summing circuit for receiving said error signal at a first input and providing an output;

a first switch having first, second and third terminals and being operable to selectively electrically couple its first or second terminal to its third terminal, said third terminal being coupled to the output of said first summing circuit and said first terminal forming said control output;

a second summing circuit having a first input coupled to the second terminal of said first switch and providing an output;

a first integrator having an input coupled to the output of said second summing circuit and having an output coupled to a second input of said first summing circuit for subtraction from said first input of said first summing circuit;

third summing circuit having a first input coupled to the output of said first integrator and having an output coupled to a second input of said second summing circuit for subtraction from the first input of said second summing circuit;

a second switch having first, second and third terminals and being operable to selectively electrically couple its first or second terminal to its third terminal, said first terminal of said second switch being coupled to the output of said third summing circuit;

a second integrator having an input coupled to the third terminal of said second switch and an output coupled as a second input to said third summing circuit for subtraction from said first input of said third summing circuit; and an amplifier having an input coupled to the output of said second integrator and an output coupled to said second terminal of said second switch.

* * * * *